United States Patent
Oh et al.

(10) Patent No.: US 10,662,831 B1
(45) Date of Patent: May 26, 2020

(54) METHOD FOR CONTROLLING ENGINE HAVING CONTINUOUS VARIABLE VALVE DURATION APPARATUS

(71) Applicants: HYUNDAI MOTOR COMPANY, Seoul (KR); KIA MOTORS CORPORATION, Seoul (KR)

(72) Inventors: Young Kyu Oh, Gwecheon-si (KR); Yeong Jin Nam, Hwaseong-si (KR); Yong Seok Kim, Seoul (KR); Se Geun Kim, Yongin-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/514,277

(22) Filed: Jul. 17, 2019

(30) Foreign Application Priority Data

Nov. 14, 2018 (KR) .......................... 10-2018-0140079

(51) Int. Cl.
| | | |
|---|---|---|
| *F01L 13/00* | (2006.01) | |
| *F01L 1/344* | (2006.01) | |
| *B60W 20/40* | (2016.01) | |
| *F02D 13/02* | (2006.01) | |

(52) U.S. Cl.
CPC ......... *F01L 13/0015* (2013.01); *B60W 20/40* (2013.01); *F01L 1/3442* (2013.01); *F01L 2013/11* (2013.01); *F02D 13/0234* (2013.01)

(58) Field of Classification Search
CPC ...... B60W 20/30; B60W 20/40; B60W 30/19; B60W 30/192; F01L 1/267; F01L 13/0015; F01L 2013/0089; F01L 2201/00; F01L 2760/001; F01L 2800/01; F02D 13/0234; F02D 2013/0292
USPC .............. 123/90.15, 90.17; 180/65.21, 65.28
See application file for complete search history.

(56) References Cited

U.S. PATENT DOCUMENTS

| | | | |
|---|---|---|---|
| 8,365,528 | B2 | 2/2013 | Leone et al. |
| 8,813,704 | B2 | 8/2014 | Kim et al. |
| 9,863,331 | B2 | 1/2018 | Ryu et al. |
| 10,132,209 | B2 | 11/2018 | Kim et al. |
| 2015/0176442 | A1 | 6/2015 | Kwak et al. |
| 2016/0252069 | A1 | 9/2016 | Teraya et al. |
| 2017/0167310 | A1 | 6/2017 | Kim et al. |

(Continued)

FOREIGN PATENT DOCUMENTS

| | | |
|---|---|---|
| CN | 106968741 A | 7/2017 |
| KR | 101655234 B1 | 9/2016 |

*Primary Examiner* — Jorge L Leon, Jr.
(74) *Attorney, Agent, or Firm* — Brinks Gilson & Lione

(57) ABSTRACT

A method for controlling an engine having a continuous variable valve duration (CVVD) apparatus is provided. The method includes: correcting a torque required by a driver; transmitting, by a hybrid control unit (HCU), a start signal to an engine control unit (ECU) when the corrected torque satisfies conditions required to drive the engine; determining a target CVVD value for operation of an intake CVVD apparatus corresponding to the corrected torque; determining a target current value corresponding to the target CVVD value; and changing the target CVVD value to a synchronizing CVVD value when a current state of the engine is in a cranking interval, wherein the synchronizing CVVD value is configured to synchronize starting revolutions per minute (RPM) of the engine with RPM of an automatic transmission or RPM of a motor generator.

7 Claims, 6 Drawing Sheets

(56) References Cited

U.S. PATENT DOCUMENTS

2017/0167404 A1* 6/2017 Ryu .................... F02D 13/0215
2017/0167408 A1   6/2017 Ryu et al.
2017/0167400 A1   7/2017 Ryu et al.

* cited by examiner

METHOD FOR CONTROLLING ENGINE HAVING CONTINUOUS VARIABLE VALVE DURATION APPARATUS

CROSS-REFERENCE TO RELATED APPLICATION

The present application claims priority to and the benefit of Korean Patent Application No. 10-2018-0140079, filed on Nov. 14, 2018, which is incorporated herein in its entirety by reference.

TECHNICAL FIELD

The present disclosure relates to a method for controlling an engine having a continuous variable valve duration (CVVD) apparatus, and more particularly, to a method for controlling an engine having a CVVD apparatus that varies a target CVVD value to lower an engine starting RPM in a cranking interval (complete explosion) of the engine.

BACKGROUND

The statements in this section merely provide background information related to the present disclosure and may not constitute prior art.

An internal combustion engine burns a mixture in which fuel and air are mixed in a predetermined ratio using a predetermined ignition method to generate power using explosion pressure. Generally, a camshaft is driven by a timing belt connected to a crankshaft which converts linear motion of a cylinder due to the explosion pressure into rotational motion to actuate an intake valve and an exhaust valve. While the intake valve is open, air is drawn into a combustion chamber, and while the exhaust valve is open, gas that has been combusted in the combustion chamber is exhausted.

The opening/closing timing and opening duration of the intake valve and the exhaust valve should be adjusted depending on operating conditions of the engine such as rotation speed or load so that optimal engine performance can be ensured. With this in mind, a continuous variable valve duration (CVVD) apparatus that adjusts the opening duration of the intake valve and the exhaust valve has been developed.

Recently, an engine having a CVVD apparatus has been applied to various hybrid vehicles such as hybrid electric vehicles (HEV) or plug-in hybrid electric vehicles (PHEV).

A hybrid vehicle may run in any one of the following driving modes: EV mode in which the hybrid vehicle is only driven by power of a motor generator; HEV mode in which the hybrid vehicle is driven by power of the engine and power of the motor generator; and engine driving mode in which the hybrid vehicle is only driven by power of the engine. In operating conditions in which the engine is required to be driven (HEV mode or engine driving mode), a CVVD value corresponding to a torque required by a driver may be determined and the CVVD apparatus may be driven according to the determined CVVD value to start the engine.

However, while the engine is being started depending on the CVVD value corresponding to the torque required by the driver, the engine starting RPM may become relatively high, which may make it difficult to synchronize RPM of the engine with RPM of an automatic transmission and/or RPM of the motor generator.

The above information described in this background section is provided to assist in understanding the background of the inventive concept, and may include any technical concept which is not considered as the prior art that is already known to those skilled in the art.

SUMMARY

An aspect of the present disclosure provides a method for controlling an engine having a continuous variable valve duration (CVVD) apparatus that varies a target CVVD value to lower an engine starting RPM in a cranking interval of the engine, thereby improving fuel efficiency and the state of charge (SOC) of a battery.

In one aspect of the present disclosure, a method for controlling an engine having a continuous variable valve duration (CVVD) apparatus may include: correcting a torque required by a driver; transmitting, by a hybrid control unit (HCU), a start signal to an engine control unit (ECU) when the corrected required torque satisfies conditions required to drive the engine; determining a target CVVD value for operation of an intake CVVD apparatus corresponding to the corrected required torque; determining a target current value corresponding to the target CVVD value; and changing the target CVVD value to a synchronizing CVVD value when a current state of the engine is in a cranking interval, wherein the synchronizing CVVD value is set to allow starting RPM of the engine to synchronize with RPM of an automatic transmission and/or RPM of a motor generator.

The method may further include: changing to a synchronizing current value corresponding to the synchronizing CVVD value; and applying the synchronizing current value to a drive motor of the intake CVVD apparatus.

The synchronizing CVVD value may be set to be greater than the target CVVD value.

The target current value corresponding to the target CVVD value may be applied to a drive motor of the intake CVVD apparatus when the current state of the engine is out of the cranking interval.

The required torque may be corrected using vehicle driving mode, gear position, engine oil temperature, coolant temperature, and intake air quantity.

The target CVVD value may be determined by putting the corrected required torque into a CVVD map, and the CVVD map may include target CVVD values which are mapped according to engine RPM and engine torque.

The target current value may be determined by putting the target CVVD value into an electric current map, and the electric current map may include current values which are mapped according to target CVVD values.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
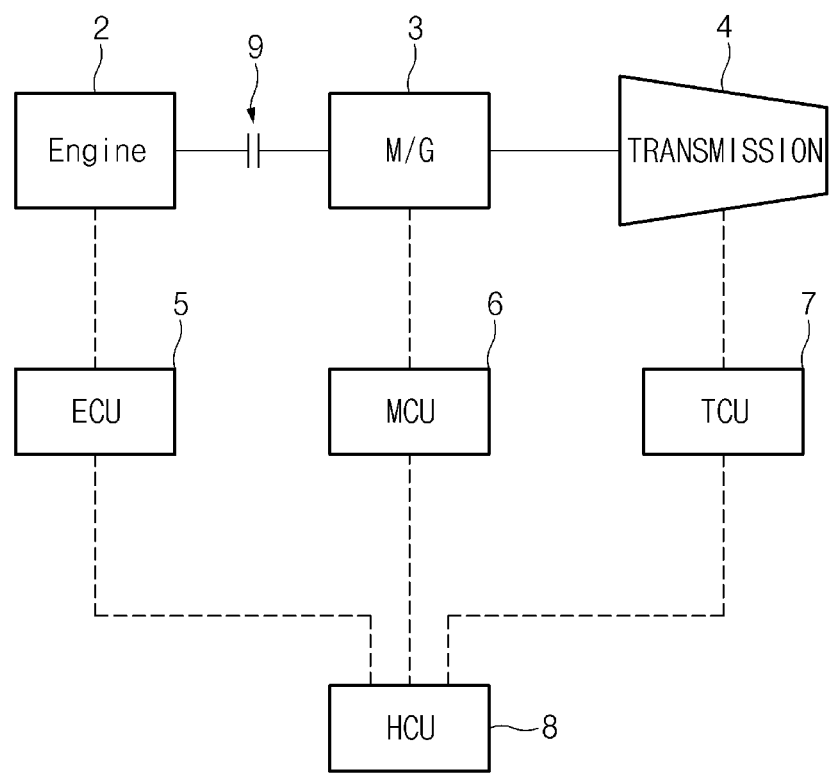
FIG. 1 illustrates the configuration of a hybrid vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in some forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Control methods in some forms of the present disclosure may be performed by at least one control unit (controller). The term "control unit (controller)" refers to a hardware device including a memory and a processor which is designed to execute one or more steps that are interpreted as its algorithmic structure. The memory stores algorithmic steps, and the processor is specifically designed to execute the algorithmic steps to perform one or more processes described below.

Furthermore, control logic in the present disclosure may be embodied in a non-transitory computer readable medium on a computer readable means including program instructions that can be executed by a processor, a controller, or the like. Examples of the computer readable means include, but are not limited to, ROM, RAM, CD-ROM, magnetic tapes, floppy disks, flash drives, smart cards, and optical data storage devices. The computer readable medium may be distributed in networked computer systems so that it may be stored and executed in a distributed manner, e.g., by a telematics server or a controller area network (CAN).

Referring to FIG. 1, a hybrid powertrain 1 of a hybrid vehicle in some forms of the present disclosure may include an engine 2, a motor generator 3, and an automatic transmission 4.

The hybrid vehicle may be a hybrid electric vehicle (HEV), a plug-in hybrid electric vehicle (PHEV), or the like.

As described below, a continuous variable valve duration (CVVD) apparatus 40 and continuous variable valve timing (CVVT) apparatuses 45 and 55 may be connected to the engine 2, and the engine 2 may be controlled by an engine control unit (ECU) 5. The ECU 5 may transmit instructions to a throttle valve (not shown), a fuel injector (not shown), the CVVT apparatuses 45 and 55, the CVVD apparatus 40, and the like to thereby control the operation of the engine 2.

The motor generator 3 may be a synchronous motor generator in which a permanent magnet is embedded in a rotor and a stator coil is wound on a stator. The motor generator 3 may be controlled by a motor control unit (MCU) 6. The MCU 6 may transmit instructions to the motor generator 3 to thereby control the operation of the motor generator 3.

A clutch 9 may be mounted between the engine 2 and the motor generator 3. By engagement and disengagement of the clutch 9, the engine 2 may be engaged with and disengaged from the motor generator 3.

The automatic transmission 4 may be configured to change gear according to the driver's intention (vehicle speed, opening degree of an accelerator pedal, and the like). The automatic transmission 4 may be controlled by a transmission control unit (TCU) 7.

The ECU 5, the MCU 6, and the TCU 7 may be connected to a hybrid control unit (HCU) 8, and the HCU 8 may be configured to manage energy consumption of the vehicle and drive the vehicle with the highest efficiency.

The HCU 8 may be configured to control the operation of the CVVD engine 2 by the control instructions of the ECU 5, the operation of the motor generator 3 by the control instructions of the MCU 6, the engagement and disengagement of the clutch 9, and gear changes of the transmission 4 by the control instructions of the TCU 7, and the like.

Meanwhile, FIG. 1 illustrates the configuration of a transmission mounted electric device (TMED) type hybrid vehicle in which the engine 2 and the motor generator 3 are connected through the clutch 9. However, the present inventive concept is not limited thereto, and may be applied to various hybrid vehicles such as a flywheel mounted electric device (FMED) type hybrid vehicle and a power branching hybrid vehicle.

Figure 2:
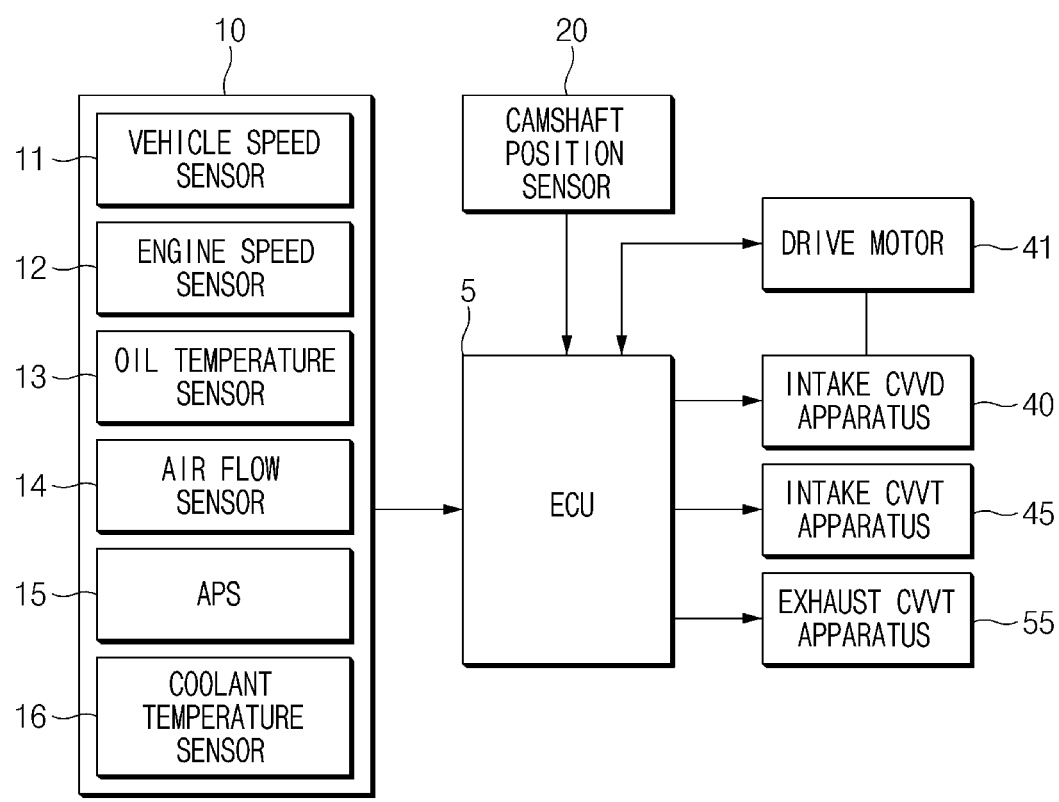
FIG. 2 illustrates the configuration of an engine control system in one form of the present disclosure.

Referring to FIG. 2, a control system of the engine 2 may include a data detector 10, a camshaft position sensor 20, the ECU 5, the intake CVVD apparatus 40, an intake CVVT apparatus 45, and an exhaust CVVT apparatus 55.

The data detector 10 may detect data related to a current driving state of the vehicle in order to control the intake CVVD apparatus 40, the intake CVVT apparatus 45, and the exhaust CVVT apparatus 55.

The data detector 10 may include a vehicle speed sensor 11, an engine speed sensor 12, an oil temperature sensor 13, a coolant temperature sensor 16, an air flow sensor 14, and an accelerator position sensor (APS) 15.

The vehicle speed sensor 11 may detect the speed of the vehicle, transmit a corresponding signal to the ECU 5, and be mounted on a wheel of the vehicle.

The engine speed sensor 12 may detect the speed of the engine according to changes in phase of a crankshaft or phase of a camshaft, and transmit a corresponding signal to the ECU 5.

The oil temperature sensor 13 may detect the temperature of engine oil, and transmit a corresponding signal to the ECU 5.

The coolant temperature sensor 16 may detect the temperature of coolant cooling the engine, and transmit a corresponding signal to the ECU 5.

The air flow sensor 14 may detect the amount of air drawn into an intake manifold, and transmit a corresponding signal to the ECU 5.

The APS 15 may detect the degree to which the driver depresses the accelerator pedal so that a position value of the accelerator pedal may be determined by the APS 15. For example, when the accelerator pedal is fully depressed, the position value of the accelerator pedal is 100%, and when the accelerator pedal is not depressed, the position value of the accelerator pedal is 0%.

In some forms of the present disclosure, a throttle position sensor (TPS) mounted on an intake passage may be used instead of the APS 15. In this case, the position value of the accelerator pedal may be determined by the degree of opening of the throttle valve.

The camshaft position sensor 20 may detect a change in angle of the camshaft, and transmit a corresponding signal to the ECU 5.

In some forms of the present disclosure illustrated in FIG. 2, the intake CVVD apparatus 40 and the intake CVVT apparatus 45 may be mounted on the intake side of the engine 2, and the exhaust CVVT apparatus 55 may be mounted on the exhaust side of the engine 2.

The intake CVVD apparatus 40 may adjust opening duration of an intake valve of the engine according to the signal of the ECU 5, and the intake CVVD apparatus 40 may be driven by a drive motor 41. The intake CVVT apparatus 45 may adjust opening/closing timing of the intake valve of the engine according to the signal of the ECU 5. The exhaust CVVT apparatus 55 may adjust opening/closing timing of an exhaust valve of the engine according to the signal of the ECU 5.

The ECU 5 may classify a plurality of control regions according to engine speed and load on the basis of the signals from the data detector 10 and the camshaft position sensor 20, and control the intake CVVD apparatus 40, the intake CVVT apparatus 45, and the exhaust CVVT apparatus 55 according to the plurality of control regions.

The ECU 5 may be at least one processor which is operated by a set program, and the set program may be programmed to control the engine having the CVVD apparatus in some forms of the present disclosure.

Some forms of the present disclosure described herein may be implemented in a recording medium readable by a computer or a similar device using software, hardware, or a combination thereof.

In the hardware implementation, some forms of the present disclosure set forth herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

In the software implementation, some forms of the present disclosure related to procedures and functions set forth herein may be implemented by separate software modules. Each of the software modules may perform one or more functions and operations described in this disclosure. Software codes may be implemented in software applications written in appropriate programming languages.

Figure 3:
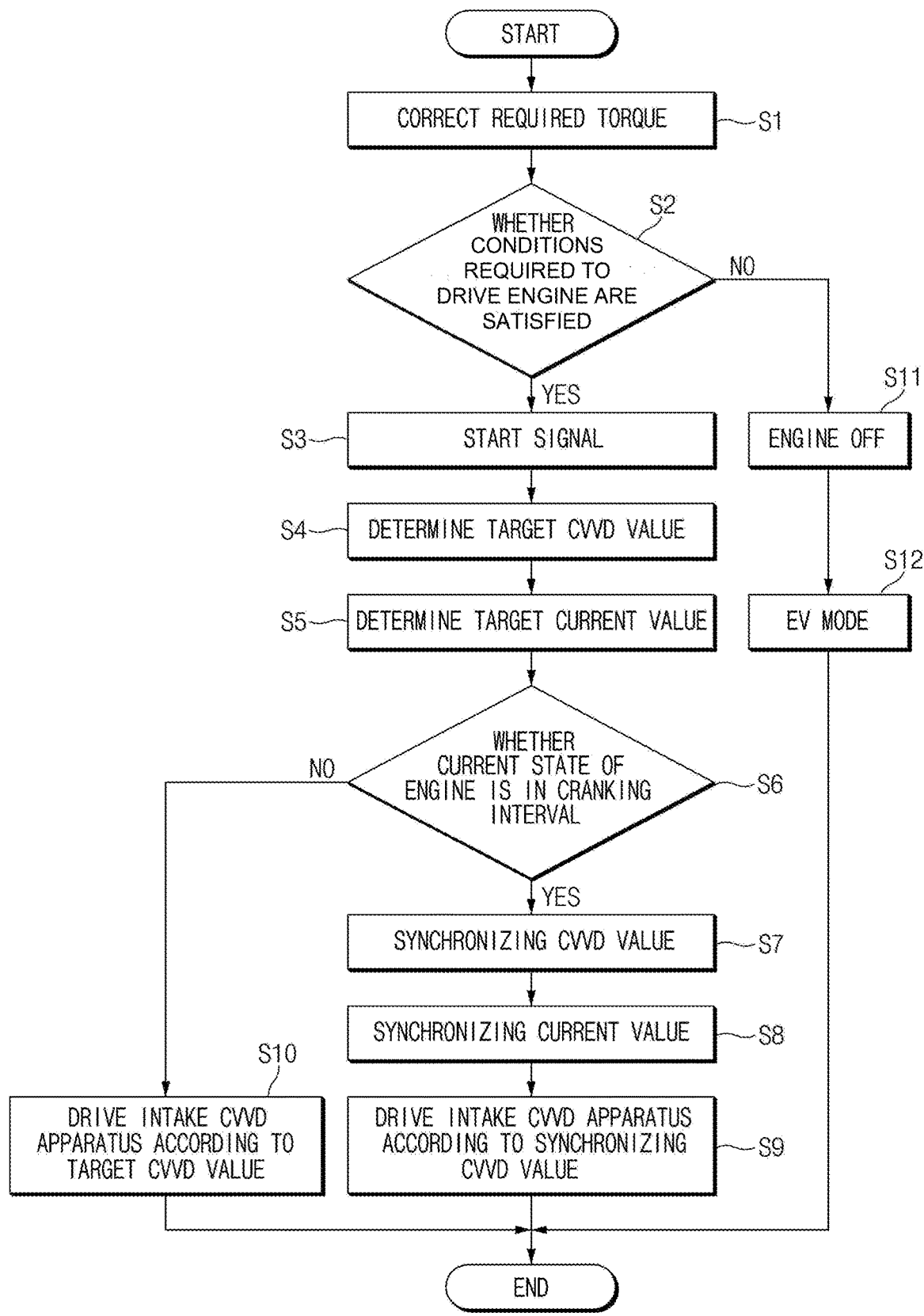
FIG. 3 illustrates a flowchart of a method for controlling an engine having a continuous variable valve duration (CVVD) apparatus in one form of the present disclosure.

Referring to FIG. 3, a method for controlling an engine having a CVVD apparatus in some forms of the present disclosure will be described in detail. When a torque required by the driver is input to the HCU 8, the HCU 8 may correct the required torque using vehicle driving mode, gear position, engine oil temperature, coolant temperature, intake air quantity, and the like in step S1.

The HCU 8 may be configured to select any one of EV mode, HEV mode, and engine driving mode, and the hybrid vehicle may run in any one of the following driving modes: the EV mode in which the hybrid vehicle is only driven by power of the motor generator; the HEV mode in which the hybrid vehicle is driven by power of the engine and power of the motor generator; and the engine driving mode in which the hybrid vehicle is only driven by power of the engine.

The HCU 8 may determine whether or not the required torque corrected by a mode selection map satisfies conditions required to drive the engine 2 in step S2. The HCU 8 may store the mode selection map in a memory thereof, and the mode selection map refers to a map in which the EV mode region, the HEV mode region, and the engine driving mode region are divided according to engine torque and engine RPM.

When the corrected required torque does not satisfy the conditions required to drive the engine 2 in step S2, the ECU 5 may turn off the engine 2 in step S11, and the MCU 6 may control the motor generator 3 to perform the EV mode in step S12.

When the corrected required torque satisfies the conditions required to drive the engine 2 in step S2, the HCU 8 may transmit a start signal for starting the engine 2 to the ECU 5 in step S3.

The HCU 8 may determine a target CVVD value for determining duration of the intake valve by the operation of the intake CVVD apparatus 40 corresponding to the corrected required torque in step S4. The memory of the HCU 8 may store a CVVD map, and the CVVD map may include target CVVD values which are mapped according to engine RPM and engine load (torque). Thus, the HCU 8 may determine the target CVVD value by putting the corrected required torque into the CVVD map.

The ECU 5 may determine a target current value corresponding to the determined target CVVD value in step S5. As the target current value is applied to the drive motor 41 of the intake CVVD apparatus 40, the intake CVVD apparatus 40 may be driven with the target CVVD value. The ECU 5 may store an electric current map in a memory thereof, and the electric current map may include current values which are mapped according to target CVVD values. Thus, the ECU 5 may determine the target current value by putting the target CVVD value into the electric current map.

The ECU 5 may determine whether or not a current state of the engine 2 is in a cranking interval (complete explosion) for restarting after the on/off of the engine 2 in step S6. For example, when RPM of the engine 2 detected by the engine speed sensor is lower than a set RPM for complete explosion, it may be determined that the current state of the engine 2 is in the cranking interval (that is, the starting of the engine 2 is not completed), and when RPM of the engine 2 detected by the engine speed sensor is higher than or equal to the set RPM for complete explosion, it may be determined that the current state of the engine 2 is out of the cranking interval (that is, the starting of the engine 2 is completed).

When it is determined in step S6 that the current state of the engine 2 is in the cranking interval (that is, when the starting of the engine 2 is not completed), the ECU 5 may change the target CVVD value to a predetermined range of synchronizing CVVD values (for example, 0-55) in step S7. The synchronizing CVVD values refer to CVVD values which are set to allow the engine starting RPM to be suitable for synchronizing with RPM of the automatic transmission 4 and/or RPM of the motor generator 3.

As the target CVVD value is changed to the synchronizing CVVD value, the ECU 5 may change to a synchronizing current value corresponding to the synchronizing CVVD value in step S8, so that the ECU 5 may apply the synchronizing current value to the drive motor 41 of the intake CVVD apparatus 40 to drive the intake CVVD apparatus 40 according to the synchronizing CVVD value in step S9. As the synchronizing current value is applied to the drive motor 41 of the intake CVVD apparatus 40, the starting RPM of the engine 2 may be adjusted to RPM suitable for synchronization. When the hybrid vehicle is running in the HEV mode, the starting RPM of the engine 2 may be accurately synchronized with the RPM of the automatic transmission 4 and the RPM of the motor generator 3, and when the hybrid vehicle is running in the engine driving mode, the starting RPM of the engine 2 may be accurately synchronized with the RPM of the automatic transmission 4.

Meanwhile, as the starting RPM of the engine 2 becomes relatively lower, the starting RPM of the engine 2 may be more accurately synchronized with the RPM of the automatic transmission 4 and/or the RPM of the motor generator 3.

Figure 4:
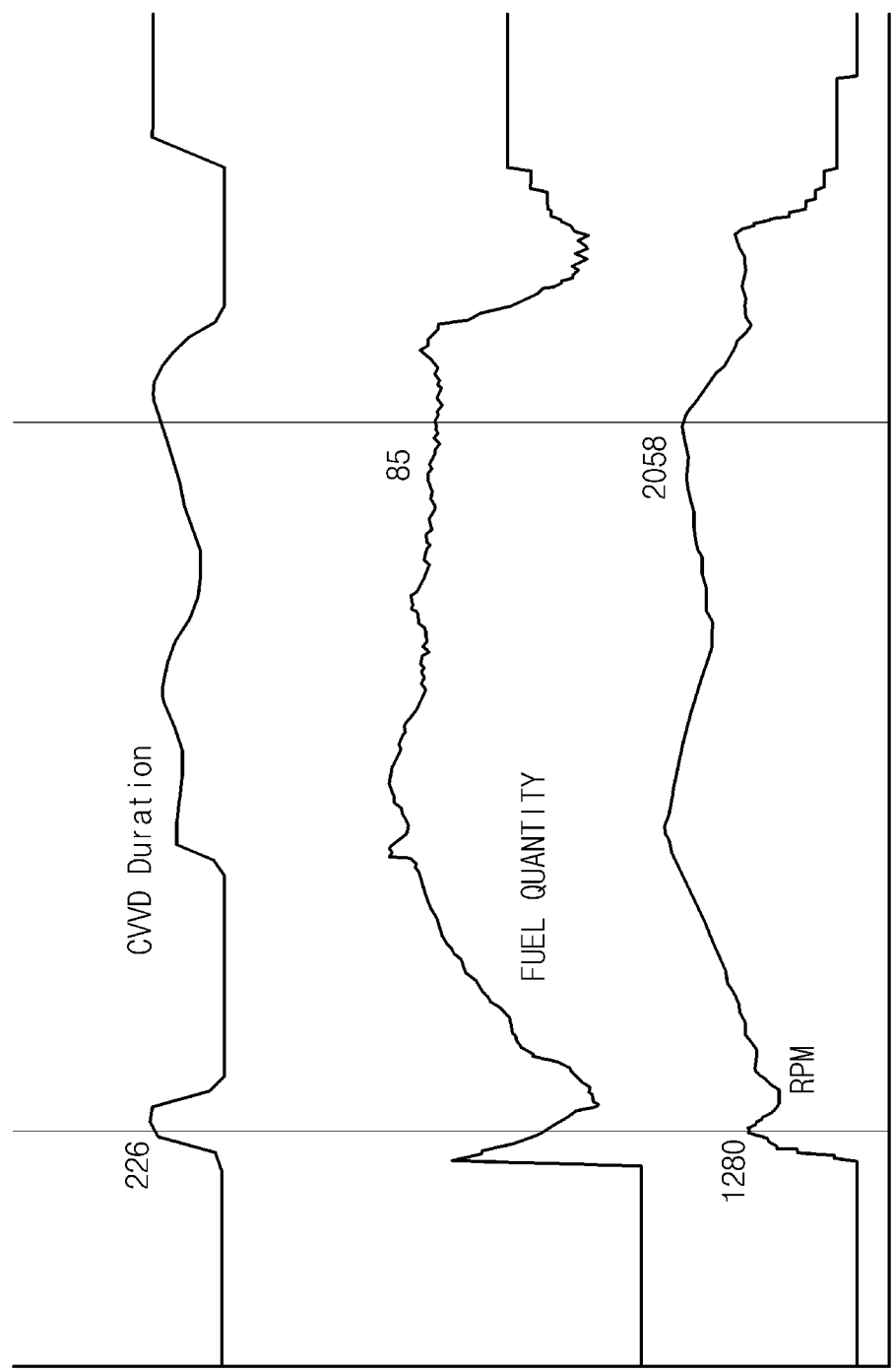
FIG. 4 illustrates a graph of fuel quantity and engine RPM when an engine starts according to target CVVD value.
Figure 5:
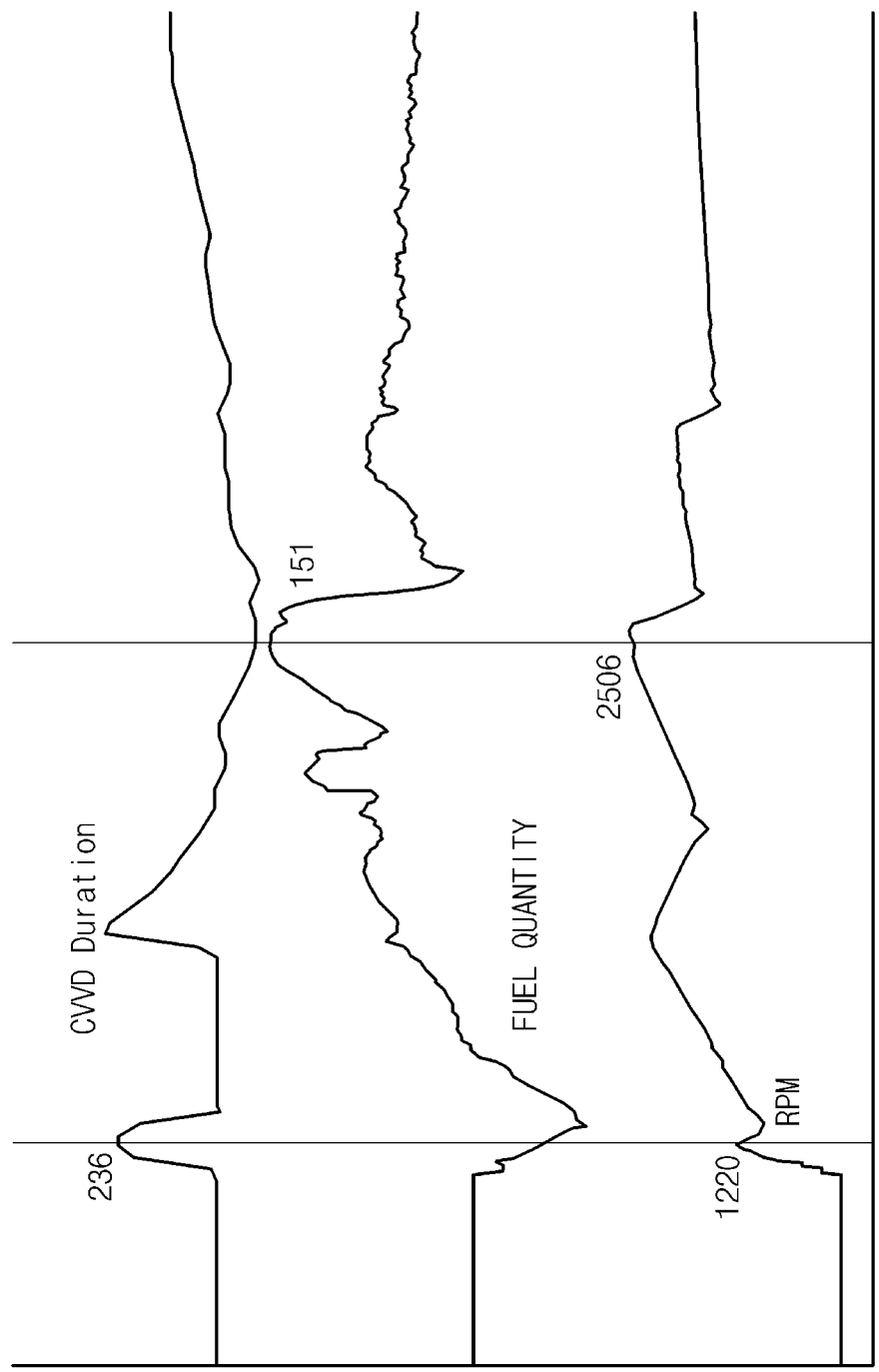
FIG. 5 illustrates a graph of fuel quantity and engine RPM when an engine starts according to synchronizing CVVD value.

In some forms of the present disclosure, the synchronizing CVVD value may be greater than the target CVVD value, so the starting RPM of the engine 2 in the cranking interval may be lowered relative to the related art starting RPM, thereby facilitating its synchronization, increasing a starting torque, and improving fuel efficiency. For example, as illustrated in FIG. 4, in a case in which a target CVVD value is 226, when the engine 2 starts in a state in which a target current value corresponding to the target CVVD value is applied to the drive motor 41 of the intake CVVD apparatus 40, a starting RPM may become 1280. In comparison, as illustrated in FIG. 5, in a case in which a CVVD value is increased to 236 (synchronizing CVVD value), a starting RPM may be lowered to 1220, and thus the synchronization may be accurately and easily performed, and the fuel efficiency may be improved.

Figure 6:
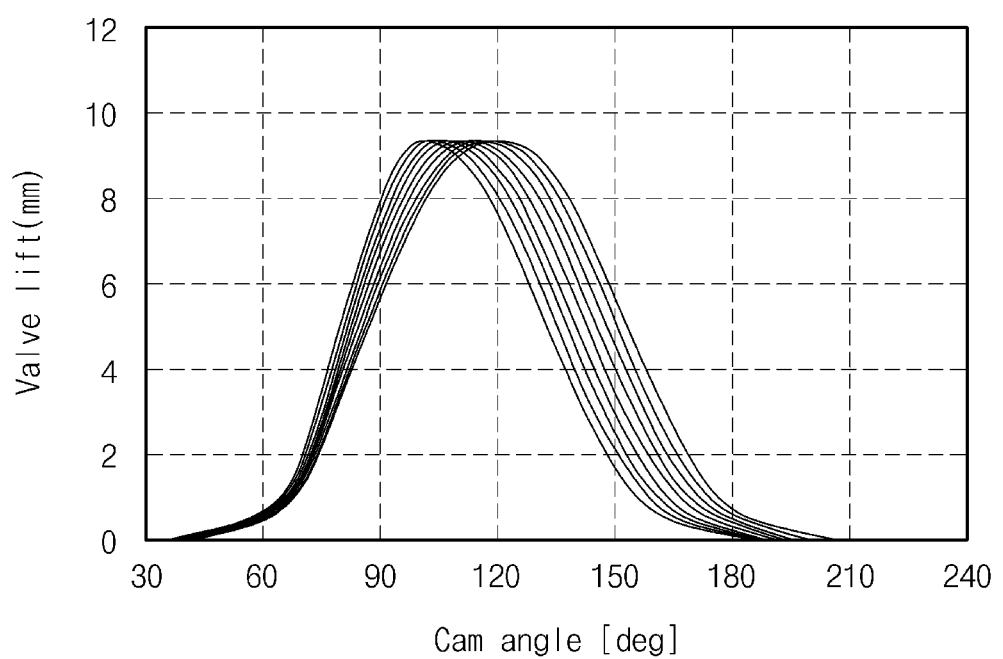
FIG. 6 illustrates a graph of a valve profile by a CVVD apparatus in one form of the present disclosure.

When it is determined in step S6 that the current state of the engine 2 is out of the cranking interval (that is, when the starting of the engine 2 is completed), the ECU 5 may apply the target current value corresponding to the target CVVD value to the drive motor 41 of the intake CVVD apparatus 40 to drive the intake CVVD apparatus 40 according to the target CVVD value in step S10. As illustrated in FIG. 6, as the intake CVVD apparatus 40 operates according to the target CVVD value, the duration of the intake valve may be determined.

As set forth above, the method for controlling an engine having a CVVD apparatus in some forms of the present disclosure may vary a target CVVD value to relatively lower an engine starting RPM in the cranking interval (complete explosion) of the engine, thereby allowing the engine starting RPM to accurately synchronize with RPM of the automatic transmission and/or RPM of the motor generator, and thus increasing a starting torque and improving fuel efficiency and the state of charge (SOC) of a battery.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. A method for controlling an engine having a continuous variable valve duration (CVVD) apparatus, the method comprising:
   correcting a torque required by a driver;
   transmitting, by a hybrid control unit (HCU), a start signal to an engine control unit (ECU) when the corrected torque satisfies conditions required to drive the engine;
   determining a target CVVD value at which an intake CVVD apparatus is to be operated, the target CVVD value corresponding to the corrected torque;
   determining a target current value corresponding to the target CVVD value;
   changing the target CVVD value to a synchronizing CVVD value when the engine is in a cranking interval, wherein the synchronizing CVVD value is configured to synchronize starting revolutions per minute (RPM) of the engine with RPM of an automatic transmission or RPM of a motor generator; and
   driving the intake CVVD apparatus based on the synchronizing CVVD value.

2. The method of claim 1, wherein the changing of the target CVVD value to the synchronizing CVVD value includes:
   changing the target current value to a synchronizing current value corresponding to the synchronizing CVVD value; and
   applying the synchronizing current value to a drive motor of the intake CVVD apparatus.

3. The method of claim 1, wherein the synchronizing CVVD value is greater than the target CVVD value.

4. The method of claim 1, further comprising:
   applying the target current value to a drive motor of the intake CVVD apparatus when the engine is not in the cranking interval.

5. The method of claim 1, wherein the correcting of the torque is based on a vehicle driving mode, a gear position, an engine oil temperature, a coolant temperature, and an intake air quantity.

6. The method of claim 1, wherein the determining of the target CVVD value includes putting the corrected torque into a CVVD map, wherein the CVVD map includes the target CVVD value that is mapped corresponding to the RPM of the engine and an engine torque.

7. The method of claim 1, wherein the determining of the target current value includes putting the target CVVD value into an electric current map, wherein the electric current map includes a current value that is mapped corresponding to the target CVVD value.

* * * * *